United States Patent
Fujimura et al.

(10) Patent No.: US 11,273,773 B2
(45) Date of Patent: Mar. 15, 2022

(54) CONDUCTION PATH

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuki Fujimura, Mie (JP); Ryoya Okamoto, Mie (JP); Hiroshi Shimizu, Mie (JP)

(73) Assignees: AUTONETWORKS TECHNOLOGIES. LTD., Mie (JP); SUMITOMO WIRING SYSTEMS, LTD., Mie (JP); SUMITOMO ELECTRIC INDUSTRIES LTD., Osaka (JP)

( * ) Notice: Subject to any disclaimer, the term of this patent is extended or adjusted under 35 U.S.C. 154(b) by 0 days.

(21) Appl. No.: 15/734,659

(22) PCT Filed: May 27, 2019

(86) PCT No.: PCT/JP2019/020793
§ 371 (c)(1),
(2) Date: Dec. 3, 2020

(87) PCT Pub. No.: WO2019/239862
PCT Pub. Date: Dec. 19, 2019

(65) Prior Publication Data
US 2021/0229607 A1    Jul. 29, 2021

(30) Foreign Application Priority Data
Jun. 12, 2018   (JP) .............................. JP2018-112138

(51) Int. Cl.
*B60R 16/02* (2006.01)
*H02G 3/04* (2006.01)

(52) U.S. Cl.
CPC ....... *B60R 16/0215* (2013.01); *H02G 3/0418* (2013.01)

(58) Field of Classification Search
CPC .......... H01B 7/0045; H01B 7/00; H01B 7/18; H01B 13/01209; H01B 13/01236;
(Continued)

(56) References Cited

U.S. PATENT DOCUMENTS 3,369,785 A * 2/1968 Moore ...................... F16L 3/00
                                                       248/68.1
3,894,706 A * 7/1975 Mizusawa ............. F16L 3/2235
                                                       248/68.1
(Continued)

FOREIGN PATENT DOCUMENTS

JP   08-235940    9/1996
JP   2011-192578  9/2011
(Continued)

OTHER PUBLICATIONS

Official Communication issued in International Bureau of WIPO Patent Application No. PCT/JP2019/020793, dated Aug. 13, 2019, along with an English translation thereof.

*Primary Examiner* — William H. Mayo, III
*Assistant Examiner* — Krystal Robinson
(74) *Attorney, Agent, or Firm* — Greenblum & Bernstein, P.L.C.

(57) ABSTRACT

A conduction path includes: a wire that has a circular cross section and includes a conductive body having an outer periphery covered by an insulating cover; a routing member that includes a routing groove in which the wire is routed; and a cover that is configured to be attached to the routing (Continued)

member and to cover the routing groove, wherein a curved surface having a curvature radius that is larger than the radius of the wire is formed in an inner surface of the routing groove, and in a state in which the cover is attached to the routing member, a distance between the cover and the inner surface of the routing groove in a direction that is perpendicular to an inward surface of the cover is the same length as the diameter of the wire.

5 Claims, 2 Drawing Sheets

(58) Field of Classification Search
CPC ........ H01B 13/01263; H01B 13/01281; H01B 13/228; H01B 13/24; H01B 1/02; H01B 1/023; H01B 5/02; H01B 5/08; H01B 7/0009; H01B 7/009; H01B 7/046; H01B 7/0807; H01B 7/0846; H01B 7/1875; H01B 7/24; H01B 7/361; H01B 7/40; H01B 7/42; H01B 7/421; H01B 9/005; H02G 3/30; H02G 3/04
USPC ........................................................ 174/70 c
See application file for complete search history.

(56) References Cited

U.S. PATENT DOCUMENTS

| | | | | |
|---|---|---|---|---|
| 4,286,630 | A * | 9/1981 | Happer | F16L 3/26 |
| | | | | 138/116 |
| 4,840,333 | A * | 6/1989 | Nakayama | F16B 5/12 |
| | | | | 248/68.1 |
| 5,033,701 | A * | 7/1991 | Kraus | B60R 16/0215 |
| | | | | 248/68.1 |
| 5,730,400 | A * | 3/1998 | Rinderer | F16L 3/24 |
| | | | | 248/68.1 |
| 5,828,007 | A | 10/1998 | Fujishita et al. | |
| 7,770,850 | B2 * | 8/2010 | Allmann | F16L 3/2235 |
| | | | | 248/68.1 |
| 10,701,846 | B1 * | 6/2020 | Kimoto | H05K 9/0009 |
| 11,114,217 | B2 * | 9/2021 | Sugino | H01B 7/185 |
| 2002/0108771 | A1 * | 8/2002 | Fu-Chung | H02G 3/30 |
| | | | | 174/117 F |
| 2005/0045357 | A1 * | 3/2005 | Ichikawa | B60R 16/0215 |
| | | | | 174/50 |
| 2013/0008710 | A1 * | 1/2013 | Toyama | B60R 16/0207 |
| | | | | 174/70 C |
| 2015/0180216 | A1 * | 6/2015 | Suzuki | B60R 16/0215 |
| | | | | 174/70 C |

FOREIGN PATENT DOCUMENTS

| | | |
|---|---|---|
| JP | 2015-109739 | 6/2015 |
| JP | 2016-046943 | 4/2016 |

* cited by examiner

CONDUCTION PATH

TECHNICAL FIELD

The technique disclosed in the present specification relates to a conduction path in which wires are routed.

BACKGROUND ART

In vehicles such as electric automobiles and hybrid vehicles, a relatively large electrical current flows to devices such as power storage elements, inverter apparatuses, and motors. For this reason, it is desirable to effectively dissipate heat that is produced by wires when the wires conduct electricity. The technique described in JP H08-235940A is known as such a technique.

In the technique mentioned above, the outer peripheral surface of an insulating cover of a wire is provided with a heat-dissipating cover member that has high thermal conductivity as well as insulating ability. Heat that is produced by the wire when the wire conducts electricity is thermally transmitted from the insulating cover to the heat-dissipating cover member, is efficiently thermally conducted inside the heat-dissipating cover member, and is efficiently dissipated from the outer peripheral surface of the heat-dissipating cover member to the outside. Thus, the level of heat dissipation of the wire is increased.

CITATION LIST

Patent Documents

Patent Document 1: JP H08-235940A

SUMMARY Of INVENTION

Technical Problem

However, with the configuration described above, heat that has reached the heat-dissipating cover member from the wire via the insulating cover is dissipated from the heat-dissipating cover member into the air. The thermal conductivity of air is relatively low, and it is therefore difficult to adequately increase the heat dissipation of a wire with the technique described above.

The larger the cross-sectional area of a wire is, the lower the amount of heat produced by the wire is, and it is therefore thought that increasing the cross-sectional area of a wire is a way to reduce the value of temperature rise in the wire. However, this method increases the size of the wire and is thus not employed.

The technique disclosed in the present specification was created based on circumstances such as those described above, and an object thereof is to provide a conduction path in which wires have increased thermal dissipation.

Solution to Problem

A conduction path disclosed in the present specification includes: a wire that has a circular cross section and includes a conductive body having an outer periphery covered by an insulating cover; a routing member that includes a routing groove in which the wire is routed; and a cover that is configured to be attached to the routing member and to cover the routing groove, wherein a curved surface having a curvature radius that is larger than the radius of the wire is formed in an inner surface of the routing groove, and in a state in which the cover is attached to the routing member, a distance between the cover and the inner surface of the routing groove in a direction that is perpendicular to an inward surface of the cover is the same length as the diameter of the wire.

With the configuration described above, the wire comes into contact with the inner surface of the routing groove and the inward surface of the cover, and therefore heat that is produced in the wire when the wire conducts electricity is transmitted to the routing member via the wire and the routing groove, and is transmitted to the cover in the order of the wire and then the cover. Thus, it is possible to increase the heat dissipation of the wire.

The curvature radius of the curved surface formed in the inner surface of the routing groove is larger than the radius of the wire, and therefore pressure is not applied from the inner surface of the routing groove to the wire. This suppresses deformation of the insulating cover caused by pressure from the routing groove. As a result, it is possible to suppress the formation of permanent gaps between the routing groove and the insulating cover by mitigating the stress of the insulating cover, and it is therefore possible to suppress a decrease in the heat dissipation of the wire.

The distance between the inward surface of the cover and the inner surface of the routing groove is the same length as the diameter of the wire, and therefore the cover and the routing groove do not apply pressure against the wire. This suppresses deformation of the insulating cover caused by pressure from the cover and the routing groove. As a result, it is possible to suppress the formation of permanent gaps between the routing groove and the insulating cover and between the cover and the insulating cover by mitigating the stress of the insulating cover, and it is therefore possible to suppress a decrease in the heat dissipation of the wire.

The following are preferable aspects as embodiments of the technique disclosed in the present specification.

The routing member includes a cover abutment portion that has a shape protruding towards the cover and is configured to abut the inward surface of the cover in a state in which the cover is attached to the routing member.

With the configuration described above, the cover abutment portion abuts the inward surface of the cover, thereby suppressing the case where the cover approaches the wire and applies pressure to the wire. Thus, deformation of the insulating cover caused by pressure from the cover is suppressed, and therefore it is possible to further suppress a decrease in the heat dissipation of the wire.

The routing member and the cover are made from a metal.

With the configuration described above, it is possible to electromagnetically shield the wire. Also, the thermal conductivity of the cover increases, and therefore the heat dissipation of the conduction path increases.

The routing member includes a hollowed portion between an outer surface of the routing member and the inner surface of the routing groove, and the hollowed portion extends along a direction that the routing groove extends.

With the configuration described above, it is possible to reduce the weight of the routing member.

The routing member and the cover are attached to each other as a single body through a lock portion provided on one of the routing member and the cover and a lock receiving portion provided on the other one of the routing member and the cover elastically locking to each other.

With the configuration described above, at least one of the lock portion and the lock receiving portion elastically deform, thereby making it possible to suppress the application of pressure from the cover or the routing member to the insulating cover of the wire. Thus, it is possible to further suppress deformation of the insulating cover.

Advantageous Effects of Invention

With the technique disclosed in the present specification, it is possible to increase the heat dissipation of the wires routed in the conduction path.

DESCRIPTION OF EMBODIMENTS

First Embodiment

Figure 1:
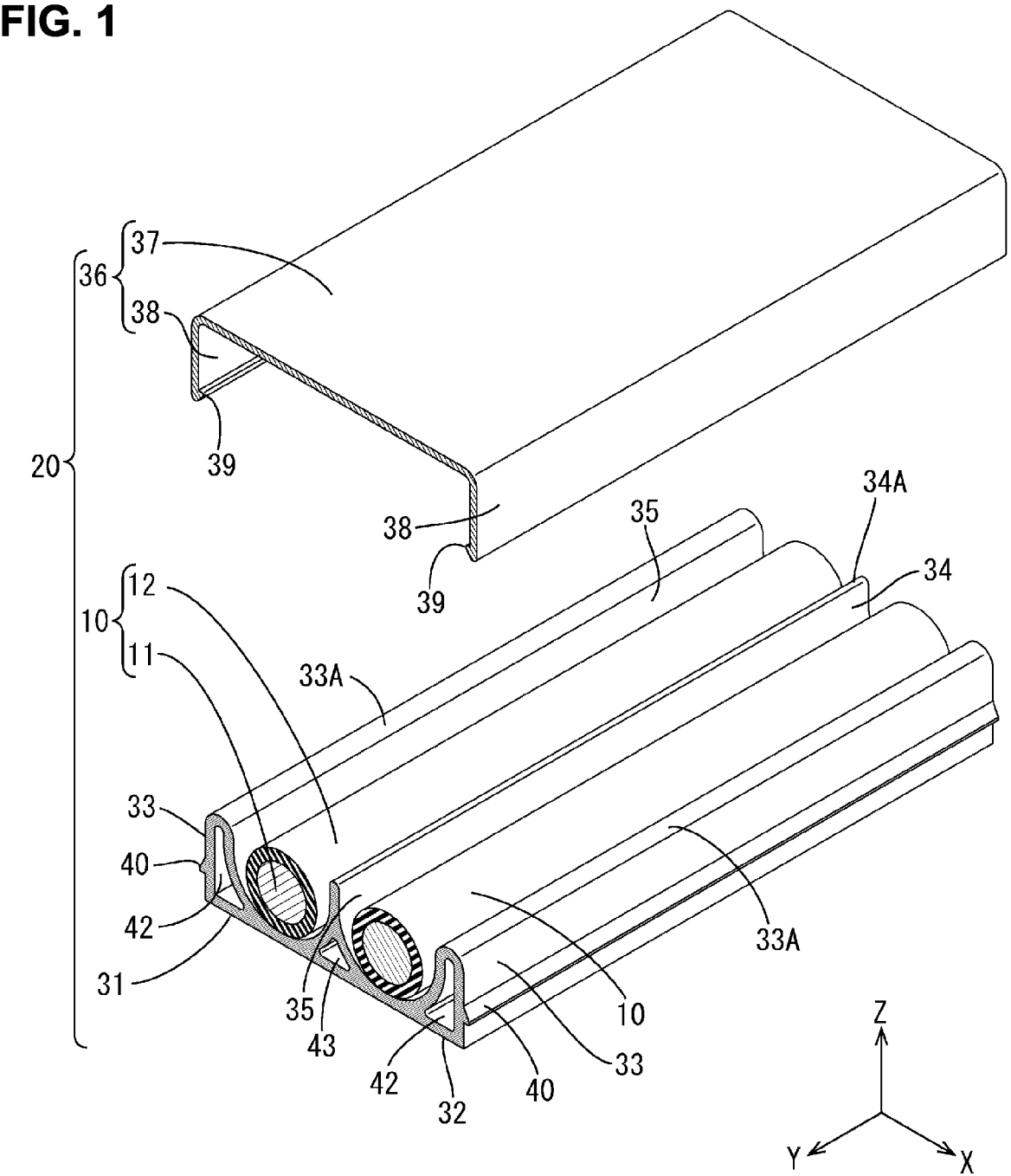
FIG. 1 is an exploded perspective view of a cut-away portion of a conduction path according to a first embodiment.
Figure 2:
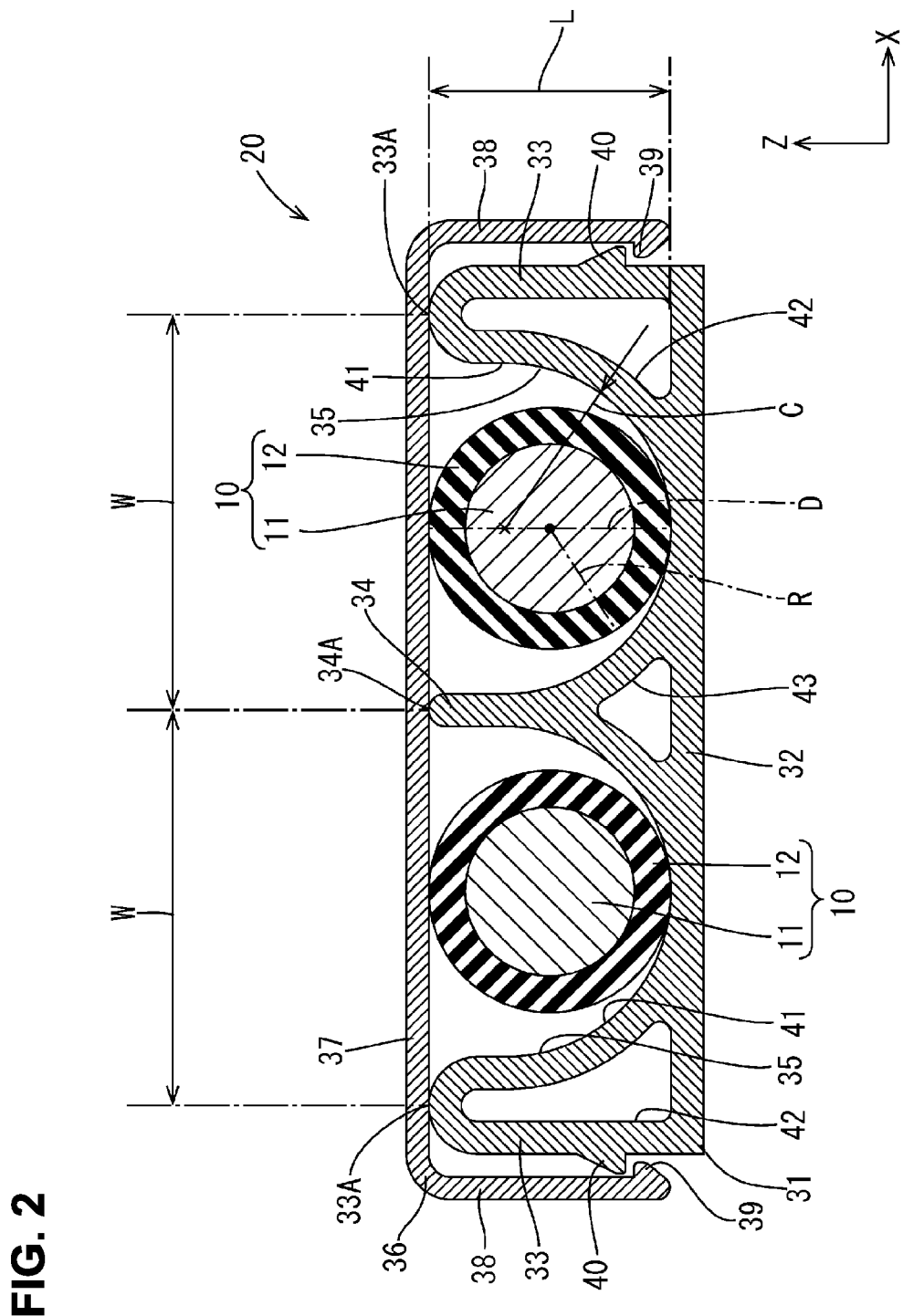
FIG. 2 is a lateral sectional view showing the conduction path.

A first embodiment of the technique disclosed in the present specification will be described with reference to FIGS. 1 and 2. A conduction path 20 of the present embodiment is installed in a vehicle (not shown) such as an electric automobile or a hybrid vehicle, and is electrically connected to a power storage module, an inverter, a motor, or the like. In the following description, the Z direction is upward, the Y direction is forward, and the X direction is leftward. Note that the directions above are set for convenience in order to describe the embodiment. Also, only some members of pluralities of the same member will be denoted with a reference numeral, and the other members will have reference numerals omitted.

Conduction Path 20

The conduction path 20 includes two wires 10, a routing member 31 in which the two wires 10 are routed, and a cover 36 that is attached to the routing member 31.

The wires 10 are constituted by conductive bodies 11 having outer peripheries encased by insulating covers 12 made from a synthetic resin having insulating properties, and the wires 10 are not provided with shield members that are equivalent to a shielding layer made from braided shielding wires. The conductive bodies 11 may be stranded wires that are made by stranding together a plurality of thin metal wires, and may also be single-core wires made from a rod-shaped metal member. The cross-sectional shape of the conductive bodies 11 is circular. The cross-sectional shape of the wires 10 is also circular. The two wires 10 have the same diameter. End portions of the wires 10 are connected to terminals (not shown), and the terminals may be connected to a power storage module, an inverter, a motor, or the like.

The routing member 31 is made from an extruded aluminum alloy material (there is no limitation thereto, and a metal such as iron, copper, stainless steel, or the like may also be used). Accordingly, the routing member 31 has a form extending in a straight line, and the cross-sectional shape of the routing member 31 perpendicular to the longitudinal direction (front-rear direction) is constant over the entire length thereof.

The routing member 31 includes a horizontal flat plate-shaped bottom wall 32 that is elongated in the front-rear direction, and includes a pair of outer walls 33 that respectively stand upward from the left and right side edges of the bottom wall 32, and a partition wall 34 that stands upward from the upper surface of the bottom wall 32 between the outer walls 33. The distances between the partition wall 34 and the adjacent outer walls 33 are substantially the same. The bottom wall 32, the outer walls 33, and the partition wall 34 form two routing grooves 35 in the routing member 31 that are elongated in the front-rear direction and are upwardly open. The two routing grooves 35 are arranged next to each other in the left-right direction, and are separated from each other by the partition wall 34. The routing member 31 has an overall shape that is upwardly open.

Lock portions 40 are respectively formed on the outer walls 33 of the routing member 31 and protrude outwardly from the outer walls 33 in the left-right direction at positions that are slightly upward from the lower edges of the outer walls 33.

Each of the routing grooves 35 individually accommodates one of the wires 10. Widths W of the routing grooves 35 in the left-right direction are larger than the diameters D of the cross-sectional shapes of the wires 10. The inner surfaces of the routing grooves 35 are provided with curved surfaces 41 that have curvature radii C that are larger than radii R of the cross-sectional shapes of the wires 10. In a state in which the wires 10 are arranged inside of the routing grooves 35, the lowermost portions of the wires 10 and the lowermost portions of the curved surfaces 41 are in contact with each other.

The cover 36 is attached to the routing member 31 and is made from an extruded aluminum alloy material likewise to the routing member 31 (there is no limitation thereto, and a metal such as iron, copper, stainless steel, and the like may also be used). The cover 36 includes an upper wall 37 that is elongated in the front-rear direction and corresponds to the shape of the routing member 31 when viewed from above, and a pair of side walls 38 that respectively extend downward from the left and right side edges of the upper wall 37. The bottom end portions of the side walls 38 are provided with lock receiving portions 39 that respectively protrude inwardly from the side walls 38 in the left-right direction.

The cover 36 is configured to be attached to the routing member 31 to form a single body by the lock receiving portions 39 of the cover 36 elastically locking to the lock portions 40 of the routing member 31. In a state in which the cover 36 is attached to the routing member 31, the upper wall 37 covers and conceals both of the openings on the upper side of the two routing grooves 35.

Also, in a state in which the cover 36 is attached to the routing member 31 to form a single body, a pair of upper end portions 33A (examples of cover abutment portions) of the outer walls 33 of the routing member 31 abut the inward surface (lower surface) of the cover 36 from below, and an upper end portion 34A (an example of a cover abutment portion) of the partition wall 34 of the routing member 31 also abuts the inner surface (lower surface) of the cover 36 from below. In a state in which the cover 36 is attached to the routing member 31 to form a single body, the pair of outer walls 33 and the partition wall 34 protrude from the bottom wall 32 of the routing member 31 towards the cover 36.

The height position of the upper end portions 33A of the pair of outer walls 33 in the up-down direction and the height position of the upper end portion 34A of the partition wall 34 in the up-down direction are the same, or if the height positions are not the same, they can be set so as to be able to be recognized as being substantially the same. The upper end portions 33A of the pair of outer walls 33 and the upper end portion 34A of the partition wall 34 abut the inward surface of the cover 36 from below, thereby keeping the cover 36 from moving downward.

In a state in which the cover 36 is attached to the routing member 31 to form a single body, the inward surface of the cover 36 and the uppermost portions of the wires 10 are in contact with each other.

Two spaces called outward hollowed portions 42 are formed extending in the front-rear direction between the bottom wall 32, the pair of outer walls 33, and the inner surfaces of the routing grooves 35 at positions towards the right and left end sides of the routing member 31 respectively. Also, a space known as an inward hollowed portion 43 is formed extending in the front-rear direction between the inner surfaces of the two routing grooves 35 and the bottom wall 32. The thickness of the metal member that constitutes the routing member 31 is made substantially uniform due to the outward hollowed portions 42 and the inward hollowed portion 43 being formed.

In a state in which the cover 36 is attached to the routing member 31 to form a single body, a distance L between the inward surface (lower surface) of the upper wall 37 of the cover 36 and the lowermost portions of the curved surfaces 41 formed in the routing grooves 35 of the routing member 31 in a direction perpendicular to the inward surface of the upper wall 37 of the cover 36 is the same length as the diameters D of the cross-sectional shapes of the wires 10, or if not the same, is set so as to be recognized as being substantially the same. Thus, in a state in which the cover 36 is attached to the routing member 31 to form a single body, a force larger than the weight of the wires 10 themselves is not applied from the cover 36 and the routing member 31 to the insulating covers 12 of the wires 10.

An example of the process used to manufacture the conduction path 20 described above will be described below. The process of manufacturing the conduction path 20 is not limited to the manufacturing process described below.

The routing member 31 is formed through extrusion molding, and the cover 36 is formed through extrusion molding.

The wires 10 are placed inside the routing grooves 35 of the routing member 31. The cover 36 is fitted to the routing member 31 from above. Thus, the conduction path of the present embodiment is complete.

Next, the actions and effects of the present embodiment will be described.

The conduction path 20 according to the present embodiment includes: the wires 10 that have circular cross sections and include the conductive bodies 11 having outer peripheries covered by the insulating covers 12; the routing member 31 that includes the routing grooves 35 in which the wires 10 are routed; and the cover 36 that is configured to be attached to the routing member 31 and to cover the routing grooves 35, wherein the curved surfaces 41 having the curvature radii C that are larger than the radii R of the wires 10 are formed in inner surfaces of the routing grooves 35, and in a state in which the cover 36 is attached to the routing member 31, the distance L between the inward surface of the cover 36 and the lowermost portions of inner surfaces of the routing grooves 35 in a direction that is perpendicular to an inward surface of the cover 36 is the same length as the diameters D of the wires 10.

With the configuration described above, the wires 10 come into contact with the inner surfaces of the routing grooves 35 and the inward surface of the cover 36, and therefore heat that is produced in the wires 10 when the wires 10 conduct electricity is transmitted to the routing member 31 via the routing grooves 35, and is also transmitted from the wires 10 to the cover 36. Thus, it is possible to increase the heat dissipation of the wires 10.

The curvature radii C of the curved surfaces 41 formed in the inner surfaces of the routing grooves 35 are larger than the radii R of the wires 10, and therefore a force larger than or equal to the weight of the wires 10 themselves is not applied thereto from the inner surfaces of the routing grooves 35. This suppresses deformation of the insulating covers 12 caused by force from the routing grooves 35. As a result, it is possible to suppress the formation of permanent gaps between the routing grooves 35 and the insulating covers 12 by mitigating the stress of the insulating covers 12, and it is therefore possible to suppress a decrease in the heat dissipation of the wires 10.

The following is a detailed description of the points described above. Suppose that the curvature radii C of the curved surfaces 41 of the routing grooves 35 are the same as the radii R of the cross-sectional shapes of the wires 10. If so, it can be assumed that the curved surfaces 41 of the routing grooves 35 would come into tight areal contact with the outer peripheries of the insulating covers 12 of the wires 10. However, there are cases where a so-called "bending tendency" occurs in the conductive bodies 11 of the wires 10 in the manufacturing process thereof. There are also cases where "bending tendency" occurs in the insulating covers 12 of the wires 10 in the manufacturing process thereof. In other words, there are cases where the wires 10 are not perfectly straight due to "bending tendency" occurring in the conductive bodies 11 and in the insulating covers 12.

In such cases, if the curvature radii C of the curved surfaces 41 of the routing grooves 35 are equal to the radii R of the cross-sectional shapes of the wires 10, then the portions of the wires 10 in which "bending tendency" has occurred are strongly pressed by the curved surfaces 41 of the routing grooves 35. If so, an excessive amount of force is applied to the portions of the insulating covers 12 that cover the portions of wires 10 in which "bending tendency" has occurred, and thus the elasticity of the insulating covers 12 is lost. As a result, gaps are formed between the portions of the insulating covers 12 that have lost elasticity and the curved surfaces 41 of the routing grooves 35.

If the insulating covers 12 have elasticity, there is a chance that the insulating covers 12 and the curved surfaces 41 of the routing grooves 35 may come back into contact with each other by the insulating covers 12 deforming back to the original state thereof. However, if the elasticity of the insulating covers 12 is lost, it is not possible to fill the gaps and the gaps will permanently exist.

The distance L between the inward surface of the cover 36 and the inner surfaces of the routing grooves 35 is the same length as the diameters D of the wires 10, and therefore the cover 36 and the routing grooves 35 do not apply excessive force against the wires 10. This suppresses deformation of the insulating covers 12 caused by force from the cover 36 and the routing grooves 35. As a result, it is possible to suppress the formation of permanent gaps between the routing grooves 35 and the insulating covers 12 and between the cover 36 and the insulating covers 12 by mitigating the stress of the insulating covers 12, and it is therefore possible to suppress a decrease in the heat dissipation of the wires 10.

Also, according to the present embodiment, the routing member 31 includes the upper end portions 33A of the outer walls 33 and the upper end portion 34A of the partition wall 34 that have shapes protruding towards the cover 36 and are configured to abut the inward surface of the cover 36 in a state in which the cover 36 is attached to the routing member 31.

With the configuration described above, the upper end portions 33A of the outer walls 33 and the upper end portion 34A of the partition wall 34 abut the inward surface of the cover 36, thereby suppressing the case where the cover 36 approaches the wires 10 and applies pressure to the wires 10. Thus, deformation of the insulating covers 12 caused by pressure from the cover 36 is suppressed, and therefore it is possible to further suppress a decrease in the heat dissipation of the wires 10.

Also, according to the present embodiment, the routing member 31 and the cover 36 are made from a metal.

With the configuration described above, it is possible to electromagnetically shield the wires 10. Also, the thermal conductivity of the routing member 31 and the cover 36 increases, and therefore the heat dissipation of the conduction path 20 increases.

Also, according to the present embodiment, the routing member 31 includes the outward hollowed portions 42 and the inward hollowed portion 43 between the outer surfaces of the routing member 31 and the inner surfaces of the routing grooves 35, and the hollowed portions extend along a direction that the routing grooves 35 extend.

With the configuration described above, it is possible to reduce the weight the routing member 31.

Also, with the present embodiment, the routing member 31 and the cover 36 are attached to each other as a single body through the lock portion provided on the routing member 31 and a lock receiving portion 39 provided on the cover 36 elastically locking to each other.

With the configuration described above, the lock portions 40 and the lock receiving portions 39 elastically lock to each other, whereby the force applied from the cover 36 or the routing member 31 to the wires 10 is absorbed in the locked portions of the lock portions 40 and the lock receiving portions 39. Thus, it is possible to further suppress deformation of the insulating covers 12 caused by the force applied to the insulating covers 12.

Other Embodiments

The technique disclosed in the present specification is not limited by the embodiments described above with reference to the drawings, and, for example, embodiments such as those described below are also included in the technical scope of the technique disclosed in the present specification.

(1) The conduction path according to the present embodiment may also be applied to a routing structure for the wires 10 in a battery pack that includes a plurality of power storage elements.

(2) Configurations are also possible in which one wire 10 is arranged in one routing member 31, or three or more wires 10 are arranged in one routing member 31.

(3) The routing member 31 and the cover 36 may also be attached to each other as a single body with bolts, rivets, or the like, and may be attached to each other as a single body through welding such as, laser welding, resistance welding, and ultrasonic welding, and any attaching structure can be appropriately employed.

(4) The upper end portions 33A of the outer walls 33 and the lower surface of the cover 36 may also be spaced apart from each other. Also, the upper end portion 34A of the partition wall 34 and the lower surface of the cover 36 may also be spaced apart from each other.

(5) The routing member 31 may also have a solid configuration that does not include one of, or does not include either of, the outward hollowed portions 42 and the inward hollowed portion 43. In such a case, the thermal conductivity of the routing member 31 is increased.

(6) Configurations are also possible in which the cover 36 is provided with the lock portions 40, and the routing member 31 is provided with the lock receiving portions 39.

(7) In the present embodiment, the routing member 31, and the cover 36 are made from metal, but there is no limitation thereto, and configurations are also possible in which one or both of the routing member 31 and the cover 36 are made from a synthetic resin.

LIST OF REFERENCE NUMERALS

10: Wires
20: Conduction path
31: Routing member
33A: Upper end portion of the outer wall (an example of a cover abutment portion)
34A: Upper end portion of the partition wall (an example of a cover abutment portion)
35: Routing groove
36: Cover
39: Lock receiving portion
40: Lock portion
41: Inner surface
42: Outward hollowed portion (an example of a hollowed portion)
43: Inward hollowed portion (an example of a hollowed portion)

The invention claimed is:

1. A conduction path, comprising:
a first wire and a second wire each of which has a circular cross section and includes a conductive body having an outer periphery covered by an insulating cover;
a routing member that includes a first routing groove and a second routing groove in which the first wire and the second wire are routed, respectively; and
a cover that is configured to be attached to the routing member and to cover the routing groove, wherein
each of the first routing groove and the second routing groove includes a curved inner surface having a curvature radius that is larger than a radius of the first wire and the second wire,
in a condition in which the cover is attached to the routing member, a distance between an inward surface of the cover and the curved inner surface of each of the first routing groove and the second routing groove in a direction that is perpendicular to the inward surface of the cover is the same length as a diameter of the first wire, and
the routing member includes:
a bottom wall;
a partition wall that extends toward the cover from an upper surface of the bottom wall and is provided between the first routing groove and the second routing groove such that the curved inner surface of the first routing groove and the curved inner surface of the second routing groove constitute opposite wall surfaces of the partition wall; and
a cover abutment portion provided at an upper end of the partition wall and is configured to abut the inward surface of the cover in a condition in which the cover is attached to the routing member.

2. The conduction path according to claim 1, wherein the routing member and the cover are made from a metal.

3. The conduction path according to claim 1, wherein
the routing member includes a hollowed portion between an outer surface of the routing member and the curved inner surface of the routing groove, the outer surface of the routing member and the curved inner surface of the routing groove are a single unitary component, and the hollowed portion extends along a direction that the routing groove extends.

4. The conduction path according to claim 1, wherein the routing member and the cover are attached to each other as a single body through a lock portion provided on one of the routing member and the cover and a lock receiving portion provided on the other one of the routing member and the cover, the lock portion and the lock receiving portion elastically locking to each other.

5. The conduction path according to claim 4, wherein
the routing member further includes an outer wall that extends upward from the upper surface of the bottom wall, the cover includes an upper wall that covers the routing groove, and a side wall that extends downward from the upper wall and covers an outer surface of the outer wall of the routing member, the lock receiving portion extends from the side wall of the cover toward the outer surface of the outer wall of the routing member, and the lock portion is provided on the outer surface of the outer wall of the routing member.

\* \* \* \* \*